US012613650B2

(12) United States Patent
Jana et al.

(10) Patent No.: US 12,613,650 B2
(45) Date of Patent: Apr. 28, 2026

(54) SAFE MIGRATION FOR RAID DEVICES

(71) Applicant: Avago Technologies International Sales Pte. Limited, Singapore (SG)

(72) Inventors: Arun Prakash Jana, Bangalore (IN); Amar Deep Kumar, Bengaluru (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/397,571

(22) Filed: Dec. 27, 2023

(65) Prior Publication Data

US 2025/0217058 A1 Jul. 3, 2025

(51) Int. Cl.
*G06F 3/06* (2006.01)

(52) U.S. Cl.
CPC .......... *G06F 3/0647* (2013.01); *G06F 3/0623* (2013.01); *G06F 3/0689* (2013.01)

(58) Field of Classification Search
CPC ..... G06F 3/0647; G06F 3/0623; G06F 3/0689
See application file for complete search history.

(56) References Cited

U.S. PATENT DOCUMENTS

| | | | | | |
|---|---|---|---|---|---|
| 6,571,354 | B1 * | 5/2003 | Parks | ............... | G06F 11/008 714/6.32 |
| 2002/0133740 | A1 * | 9/2002 | Oldfield | ............... | H04L 1/22 714/6.12 |
| 2012/0144114 | A1 * | 6/2012 | Porel | ............... | G06F 3/0605 711/170 |
| 2019/0179564 | A1 * | 6/2019 | Bernat | ............... | G06F 3/0631 |
| 2023/0305727 | A1 * | 9/2023 | Blea | ............... | G06F 3/0604 |

* cited by examiner

*Primary Examiner* — Daniel C. Chappell
*Assistant Examiner* — Chen Gu
(74) *Attorney, Agent, or Firm* — Quarles & Brady LLP

(57) ABSTRACT

Novel tools and techniques are provided for implementing migration of one or more drives, and more particularly to methods, systems, and apparatuses for implementing migration of one or more drives by setting one or more indications on a memory of the one or more drives. A controller for a redundant array of independent disks can be configured to set a first indication indicating a first drive is safe to migrate or not safe to migrate and store the first indication in a first memory on the first drive. The first drive can be a mirror of a second drive. The controller can further be configured to set a second indication indicating the second drive was offline or not offline and store the second indication in the first memory on the first drive.

20 Claims, 8 Drawing Sheets

| Drive 1 | | Drive 2 | | Allow Import? | Safe Migration Details | LD State |
|---|---|---|---|---|---|---|
| SafeTo Migrate | LastMirror StateOffline | SafeTo Migrate | LastMirror StateOffline | | | |
| FALSE | FALSE | FALSE | FALSE | Yes | The Mirrors are consistent data-wise | OPTIMAL |
| TRUE | TRUE | FALSE | FALSE | Import Drive 1 Rebuild Drive 2 | LD was degraded at the time of Safe Migration | DEGRADED |
| FALSE | FALSE | TRUE | TRUE | Rebuild Drive 1 Import Drive 2 | LD was degraded at the time of Safe Migration | DEGRADED |
| TRUE | FALSE | TRUE | FALSE | Import Drive 1 Import Drive 2 | LD was optimal at the time of Safe Migration | OPTIMAL |
| FALSE | FALSE | TRUE | FALSE | Rebuild Drive 1 Import Drive 2 | Power failed before Drive 1 update during Safe Migration | DEGRADED |
| TRUE | FALSE | FALSE | FALSE | Import Drive 1 Rebuild Drive 2 | Power failed before Drive 2 update during Safe Migration | DEGRADED |
| TRUE | TRUE | TRUE | TRUE | Not possible | - | - |

802
804
806
808
810
812
814

800

Detect a first drive is offline

402

Determine the second drive is not offline

404

Receive a request to migrate the second drive

406

Prepare the second drive for migration

408

Determine the second drive is ready to be migrated

409

Set or generate a first indication for the second drive

410

Store the first indication on the second drive

412

Set or generate a second indication for the second drive

414

Store the second indication on the second drive

416

Cause the first drive and/or the second drive to go offline or spin down the first drive and/or the second drive

418

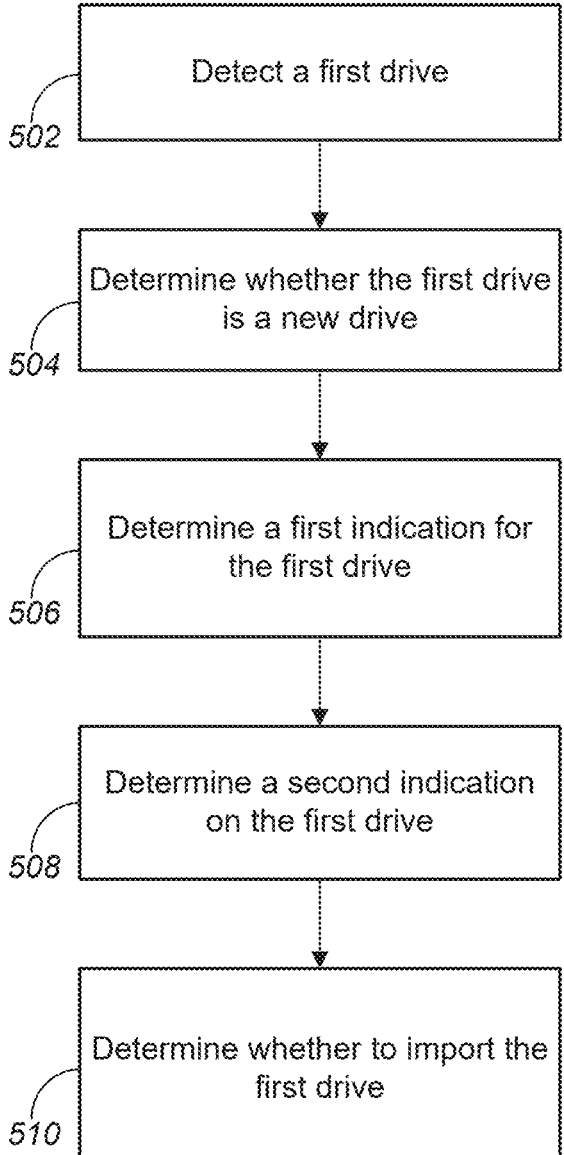
502 — Detect a first drive
504 — Determine whether the first drive is a new drive
506 — Determine a first indication for the first drive
508 — Determine a second indication on the first drive
510 — Determine whether to import the first drive
500
Fig. 5

| SafeTo Migrate | LastMirror StateOffline | Allow Import? | Safe Migration Details | LD State |
|---|---|---|---|---|
| TRUE | TRUE | Yes | LD was degraded at the time of Safe Migration | DEGRADED |
| TRUE | FALSE | Yes | LD was optimal at the time of Safe Migration | DEGRADED |
| FALSE | FALSE | No | Drive was not Safely Migrated Allow Forced Import | - |
| FALSE | TRUE | Not Possible | - | - |

702 — Detect a first drive

704 — Determine whether the first drive is a new drive

706 — Determine a first indication on the first drive

708 — Determine a second indication on the first drive

710 — Detect a second drive

712 — Determine whether the second drive is a new drive

714 — Determine a third indication on the second drive

716 — Determine a fourth indication on the second drive

718 — Determine whether to import the first drive and the second drive

700 —

Fig. 7

| Drive 1 | | Drive 2 | | Allow Import? | Safe Migration Details | LD State |
|---|---|---|---|---|---|---|
| SafeTo Migrate | LastMirror StateOffline | SafeTo Migrate | LastMirror StateOffline | | | |
| FALSE | FALSE | FALSE | FALSE | Yes | The Mirrors are consistent data-wise | OPTIMAL |
| TRUE | TRUE | FALSE | FALSE | Import Drive 1 Rebuild Drive 2 | LD was degraded at the time of Safe Migration | DEGRADED |
| FALSE | FALSE | TRUE | TRUE | Rebuild Drive 1 Import Drive 2 | LD was degraded at the time of Safe Migration | DEGRADED |
| TRUE | FALSE | TRUE | FALSE | Import Drive 1 Import Drive 2 | LD was optimal at the time of Safe Migration | OPTIMAL |
| FALSE | FALSE | TRUE | FALSE | Rebuild Drive 1 Import Drive 2 | Power failed before Drive 1 update during Safe Migration | DEGRADED |
| TRUE | FALSE | FALSE | FALSE | Import Drive 1 Rebuild Drive 2 | Power failed before Drive 2 update during Safe Migration | DEGRADED |
| TRUE | TRUE | TRUE | TRUE | Not possible | - | - |

SAFE MIGRATION FOR RAID DEVICES

COPYRIGHT STATEMENT

FIELD

The present disclosure relates, in general, to methods, systems, and apparatuses for implementing migration of one or more drives.

BACKGROUND

Redundant array of independent disks (RAID) is a way of storing data in different places on multiple hard drives or solid-state drives in a storage array. There are different RAID levels (e.g., RAID 0-RAID 5). RAID 1 comprises at least two drives, such as a first drive and a mirror drive that copies (e.g., exactly copies, partially copies, or the like), duplicates, backs up, or mirrors the data of the first drive. A RAID controller is a device used to manage the hard drives or solid-state drives in the storage array.

For RAID 1 devices, there is a risk of data corruption during migration of a RAID storage drive or device to a different storage array or a different RAID controller. For example, when a RAID storage drive is removed from a storage array or a RAID controller, inputs/outputs can continue on the mirror drive of the removed RAID storage drive. Because the inputs/outputs can continue on the mirror of the removed RAID storage drive, the removed RAID storage drive may not have the latest and correct data. Thus, when the RAID storage drive is imported by a new or different controller, the new or different controller may not be importing the latest and correct data from the RAID storage drive.

Hence, there is a need for more robust and scalable solutions for implementing migration of one or more drives. Thus, methods and systems are provided for implementing migration of one or more drives in a RAID 1 storage array.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 4 is a flow diagram of a method to prepare a storage drive for migration based on a detection of an offline state in a mirror drive of the storage drive, in accordance with various embodiments;

FIG. 5 is a flow diagram of a method to migrate a storage drive, in accordance with various embodiments;

FIG. 6 is a table illustrating different decisions a controller can make during migration of a storage drive, in accordance with various embodiments;

FIG. 7 is a flow diagram of a method to migrate one or more storage drives, in accordance with various embodiments; and FIG. 8 is a table illustrating different decisions a controller can make during migration of a first storage drive and a second storage drive, in accordance with various embodiments.

DETAILED DESCRIPTION OF EMBODIMENTS

Figure 1:
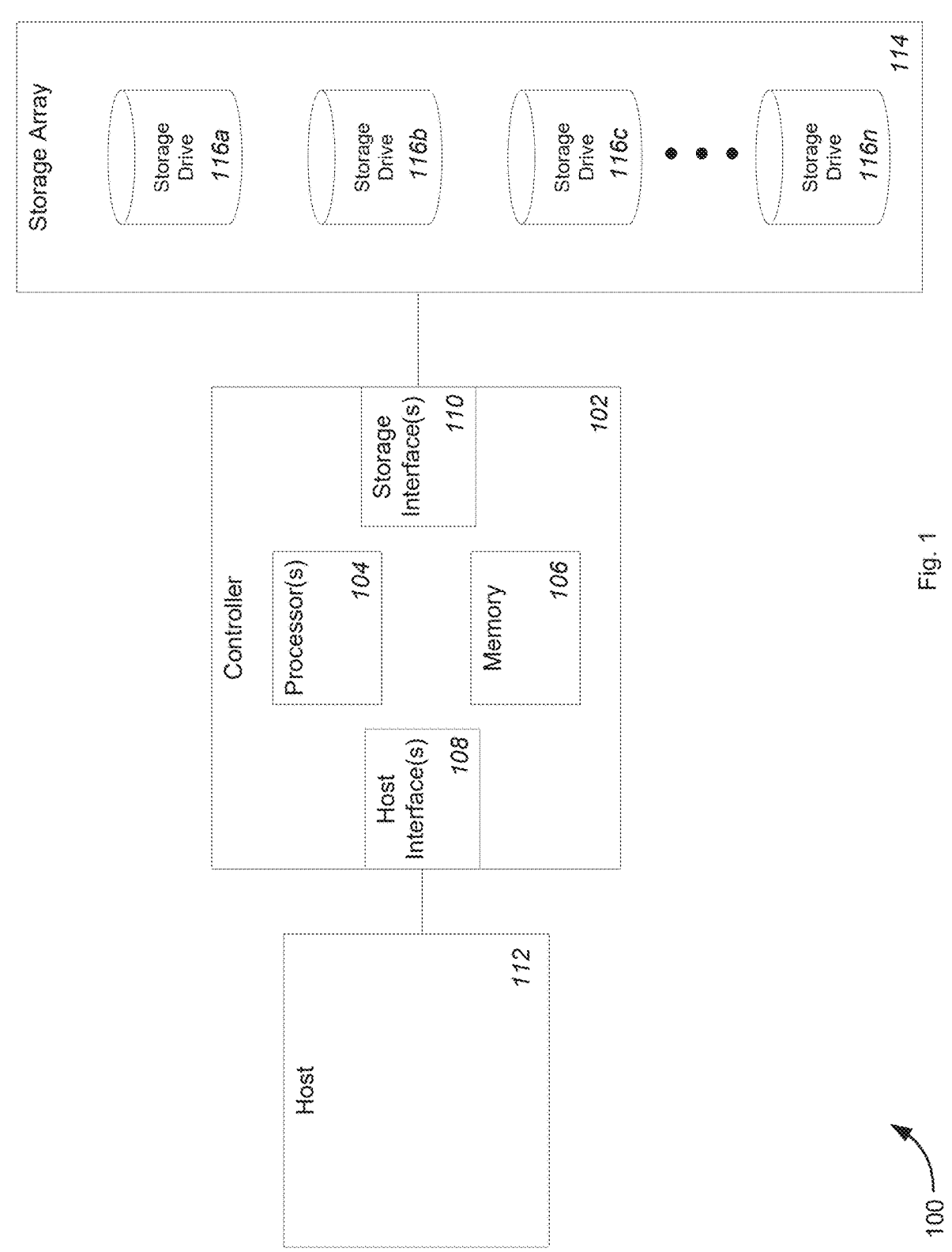
FIG. 1 is a block diagram of a system having a controller, host system, and storage array, in accordance with various embodiments.

Various embodiments provide tools and techniques for migration of one or more drives. More particularly, methods, systems, and apparatuses are provided for implementing migration of one or more drives in a RAID 1 storage array.

In a first aspect, a controller for a redundant array of independent disks (RAID) comprises a processor configured to set a first indication indicating a first drive is safe to migrate or not safe to migrate; store the first indication in a first memory on the first drive; set a second indication indicating the second drive was not offline or offline; and store the second indication in the first memory on the first drive. The first drive can be a mirror of a second drive.

In some cases, the controller can receive input indicating a location to store at least one of the first indication or the second indication in the first memory of the first drive.

In some embodiments, the processor can further be configured to determine the first drive is new and based on a determination that the first drive is new, set the first indication to indicate that the first drive is not safe to migrate and set the second indication to indicate that the second drive was not offline.

In various instances, the processor can further be configured to receive a request to migrate the first drive; in response to receiving the request to migrate the first drive, prepare the first drive to be migrated; determine the first drive is ready to be migrated; in response to a determination that the first drive is ready to be migrated, set the first indication indicating the first drive is safe to migrate; and store the first indication indicating the first drive is safe to migrate in the first memory of the first drive. The request to migrate the first drive can be received in response to an input requesting migration of a logical drive comprising the first drive. In response to the input requesting migration of the first drive, the processor is further configured to determine the second drive is not offline; based on a determination the second drive is not offline, prepare the second drive to be migrated; determine the second drive is prepared to be migrated; in response to a determination that the second drive is prepared to be migrated, set a third indication indicating the second drive is safe to migrate; and store the third indication indicating the second drive is safe to migrate in a second memory of the second drive. In some cases, the processor can further be configured to cause the first drive and the second drive to go offline at about a same time. In some cases, the second indication indicates the second drive was not offline and a fourth indication stored in a second memory of the second drive indicates the first drive was not offline.

In various embodiments, the processor is further configured to detect the second drive is offline, in response to detecting the second drive is offline, prepare the first drive to be migrated; determine the first drive is ready to be migrated; in response to a determination that the first drive is ready to be migrated, set the first indication indicating the first drive is safe to migrate; and store the first indication indicating the first drive is safe to migrate in the first memory of the first drive. In response to storing the first indication indicating the first drive is safe to migrate in the first memory of the first drive, the processor can further be configured to set the second indication indicating the second drive was offline; store the second indication indicating the second drive was offline in the first memory of the first drive; and cause the first drive to go offline.

In some cases, the processor is further configured to detect a third drive coupled to the controller; and, in response to detecting the third drive, determine whether a fifth indication stored in a third memory of the third drive indicates the third drive was safe to migrate or not safe to migrate and determine whether a sixth indication stored in the third memory of the third drive indicates a fourth drive was offline or not offline. In some cases, the fourth drive is a mirror of the third drive. The processor can further be configured to determine the fifth indication indicates the third drive is safe to migrate; determine the sixth indication indicates the fourth drive was offline, and in response to determining the fifth indication indicates the third drive is safe to migrate and the sixth indication indicates the fourth drive was offline, import data from the third drive.

In another aspect, a first drive for a redundant array of independent disks (RAID) comprises a memory configured to store a first indication indicating the first drive is safe to migrate or not safe to migrate, store a second indication indicating the second drive was offline or not offline. In some cases, the first drive is a mirror of a second drive.

In some instances, the memory is further configured to store identification information associated with the second drive. The identification information comprises at least one of an identification number associated with the second drive, an internet protocol address associated with the second drive, a media access control address associated with the second drive, or a globally unique identifier associated with the second drive.

In various cases, the memory comprises at least one of optical or magnetic disk storage, flash memory, or programmable read-only memories. In some cases, the first drive can receive input indicating a location to store at least one of the first indication or the second indication in the memory of the first drive.

In another aspect a method for operating a controller of a redundant array of independent disks (RAID) comprises detecting a first drive; determining a first indication stored in a first memory of the first drive indicating the first drive is safe to migrate or not safe to migrate; and determining a second indication stored in the first memory of the first drive indicating the second drive was offline or not offline. In some cases, the first drive is a mirror of a second drive.

In some embodiments, the method can further include determining the first indication indicates the first drive is safe to migrate; determining the second indication indicates the second drive was offline; and in response to determining the first indication indicates the first drive is safe to migrate and the second indication indicates the second drive was offline, importing data from the first drive.

In various instances, the method can further include determining the first indication indicates the first drive is safe to migrate; determining the second indication indicates the second drive was not offline; and in response to determining the first indication indicates the first drive is safe to migrate and the second indication indicates the second drive was not offline, at least one of waiting to import data from the first drive until a second drive is detected or importing the first drive based on an input to import the first drive. In some instances, the method can further include detecting the second drive coupled to the controller; determining a third indication stored in a second memory of the second drive indicates the second drive is safe to migrate; determining a fourth indication stored in the second memory of the second drive indicates the first drive was not offline; and in response to determining the first indication indicates the first drive is safe to migrate, the second indication indicates the second drive was not offline, the third indication indicates the second drive is safe to migrate, and the fourth indication indicates the first drive was not offline, importing the data from the first drive and the second drive.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the disclosure, as other embodiments of the disclosure may omit such features.

Similarly, when an element is referred to herein as being "connected" or "coupled" to another element (such as through electrical or communicative connection or coupling), it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Likewise, when an element is referred to herein as being an "electronic circuit" or simply "circuit", it is commonly recognized as a building block of modern electronics. Circuits are composed of various electronic components such as resistors, capacitors, inductors, diodes, transistors, and integrated circuits. In some cases, integrated circuits can be formed from one or more circuits. These electronic components are carefully selected and interconnected to create a circuit that can perform a specific task or carry out a particular function. Circuits can be as simple as a basic switch that turns a light on and off, or they can be incredibly complex, such as those found in advanced computer systems, communication devices, or medical equipment. Circuits can be categorized into different types based on their purpose or function, including amplifiers, oscillators, filters, power supplies, and logic gates, among others. Additionally, circuits can include software or firmware in addition to hardware or instead of hardware to carry out a particular function.

Additionally, various processors, controllers, units, circuits, modules, or other components may be described as "configured to" or "adapted to" perform a task or tasks. In such contexts, "configured to" or "adapted to" is a broad recitation of structure generally meaning "having circuitry that" performs the task or tasks during operation. As such, the processor/controller/unit/circuit/module/component can be configured to perform the task even when the processor/ controller/unit/circuit/module/component is not currently on. In general, the circuitry that forms the structure corresponding to "configured to" or "adapted to" may include hardware circuits and/or memory storing program instructions executable to implement the operation. The memory can include volatile memory such as static or dynamic random-access memory and/or nonvolatile memory such as optical or magnetic disk storage, flash memory, programmable read-only memories, etc. Similarly, the processor/ controller/unit/circuit/module/component may be described as performing a task or tasks, for convenience in the description. Such descriptions should be interpreted as including the phrase "configured to" or "adapted to." Reciting a processor/controller/unit/circuit/module/component that is configured to perform one or more tasks is expressly intended not to invoke 35 U.S.C. § 112, paragraph six interpretation for that processor/controller/unit/circuit/module/component.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included." should be considered non-exclusive. Also, terms such as "element" or "component" encompass both elements and components comprising one unit and elements and components that comprise more than one unit, unless specifically stated otherwise.

Additionally, it should be understood that spatial descriptions (e.g., "above," "below." "up." "left." "right," "down." "top," "bottom," "middle," "vertical," "horizontal," etc.) used herein are for purposes of illustration only, and that practical implementations of the structures described herein can be spatially arranged in any orientation or manner. Further, descriptions such as "first," "second," "third," etc. used herein are for purposes of distinguishing different aspects of each embodiment, and such terms are not intended to denote any particular order or sequence unless expressly indicated otherwise.

In various existing redundant array of independent disks (RAID) 1 storage arrays, there is a risk of data corruption during migration of a RAID storage drive or device to a different storage array or a different RAID controller. For example, when a RAID storage drive is removed from a storage array or a RAID controller, inputs/outputs can continue on a mirror drive of the removed RAID storage drive. Because the inputs/outputs can continue on the mirror drive of the removed RAID storage drive, the removed RAID storage drive may not have the latest and correct data. It is also difficult for the different controller to determine whether the removed RAID storage drive has the latest and correct data. Thus, the removed RAID storage drive is frequently imported using a foreign import when it is coupled to a different storage array or a different RAID controller. The foreign import can include importing data from a storage drive that is inconsistent or not synchronized with the controller or the storage array. The foreign import can occur when a RAID controller does not recognize the storage drive and cannot determine whether the storage drive has the latest and correct data.

The proposed drive migration systems and methods seek to reduce the risk of data corruption during migration of a RAID storage drive or device to a different storage array or a different RAID controller. In order to reduce the risk of data corruption, information can be stored on a drive itself (e.g., in a memory of the drive) indicating (1) whether the drive is safe (e.g., prepared, ready, capable, able, etc.) to migrate (e.g., to move or transfer to a different controller, different storage array, or the like); and (2) whether the mirror drive of the drive was offline (e.g., offline, not coupled to the controller, powered down, removed, malfunctioning, spun down, asleep, and/or the like) at the time when the drive went offline. A drive can be safe to migrate if the drive has been prepared for migration and is safely spun down after receiving a command or a request to migrate the drive. A drive can indicate whether the mirror drive of the drive went offline before the drive went offline.

FIG. 1 is a schematic view of computing system 100 configured to provide migration of one or more drives in a storage array. The computing system 100 comprises a controller (or storage controller) 102 (e.g., a hard disk drive (HDD) controller, a solid-state drive (SSD) controller, a small computer system interface (SCSI) controller, a serial attached SCSI (SAS) controller, a redundant array of independent disks (RAID) controller, etc.).

In various embodiments, the controller 102 can include any suitable circuitry, logic, hardware, software, and/or code configured to allow communication between a host system 112 and the controller 102 and/or the storage array 114, allow communication (e.g., wireless communication, wired communication, and/or the like) between the storage array 114 and the controller 102 and/or the host system 112, allow safe migration of one or more drives in the storage array 114, and/or other functionalities.

In some cases, the controller 102 includes a processor 104 and a memory 106. The processor 104 can include an Integrated Circuit (IC) chip or multiple IC chips, a CPU, a microprocessor, or the like. The processor 104 can be configured to execute instructions stored in memory 106. The memory 106 may be volatile and/or non-volatile in nature. The memory 106 may include any hardware component or collection of hardware components that are capable of storing instructions and communicating those instructions to the processor 104 for execution. Non-limiting examples of memory 106 include random-access memory (RAM), static or dynamic random-access memory, read-only memory (ROM), flash memory, electrically erasable programmable read-only memory (EEPROM), optical or magnetic disk storage, flash memory, programmable read-only memories, variants thereof, combinations thereof, and the like.

In some cases, the controller 102 can include a host interface(s) 108 and a storage interface(s) 110. The host interface 108 of the controller 102 can enable the controller 102 to communicate with and/or couple to a host system 112. In some instances, host interface 108 can be used to transmit data to or receive data from host system(s) 112. The host system 112 can include, without limitation, one or more of a user computer, laptop, workstation, server, collection of servers, or the like. In some cases, the controller 102 can be integrated with the host system 112. Alternatively, the controller 102 can be separate from the host system 112. In some cases, the host system 112 might not be included in computing system 100.

The storage interface 110 can enable the controller 102 to communicate with and/or couple to a storage array 114 and/or one or more storage drives or devices 116a-116n in the storage array 114. In some instances, the storage interface 110 can be used to transmit data to or receive data from the storage array 114 and/or one or more storage drives 116a-116n. The storage array 114 and/or one or more storage drives 116a-116n may be co-located with one another or may be physically located in different geographical locations. The storage array 114 and/or one or more storage drives 116a-116n can include, without limitation, hard disk drives (HDDs), solid-state drives (SSDs), non-volatile memory express (NVMe)-capable SSDs, or combinations thereof, or the like.

In various cases, the controller 102 can be configured to make the multiple storage drives 116a-116n appear to a host system 112 as a single high capacity logical storage volume (e.g., a logical drive or a logical device). Thus, the controller 102 can be configured to automatically store data supplied from the host system 112 across the multiple storage drives 116a-116n without ever exposing the manner in which the data is actually distributed to the host system 112. The controller 102 can further be configured to automatically retrieve data requested by the host system 112 from across the multiple storage drives 116a-116n without ever exposing the manner in which the data is actually provided to the host system 112.

The system 100 can utilize any type of data storage architecture or storage array 114. The particular architecture or storage array 114 depicted and described herein should not be construed as limiting example embodiments. However, the methods and migration processes described herein are relevant to RAID 1 storage architectures or storage arrays 114 (e.g., RAID 1, RAID 10, RAID 1E, etc.).

In a RAID 1 storage architecture, each piece of data stored from a host system (e.g., host system(s) 112) in a storage array is mirrored within the storage array. In other words, RAID 1 mirrors data on two or more drives or disks. In some cases, a first drive (e.g., first drive 116a) has one or more corresponding mirror drives (e.g., mirror drive 116b).

In operation, the controller 102 can be configured to set or store on a memory of each drive of the storage drives 116a-116n (1) a first indication of whether the storage drive is safe to migrate at the time the storage drive was uncoupled or removed from the controller 102 or storage array 114 and (2) a second indication of whether a mirror drive of the storage drive was offline at the time the storage drive was ready to migrate. The first indication and the second indication can be stored on the storage drives 116a-116n themselves.

The controller 102 can determine a particular location in the storage drives 116a-116n to store the first indication and the second indication. In some cases, a vendor or a user of the controller 102, host system 112, and/or storage array 114 can specify or provide input to the controller indicating where to store the first indication and the second indication. Each indication is a single bit within an unsigned 32 bit field and can be placed next to one another. Thus, the first indication and the second indication can be stored and accessed together atomically by the controller 102 managing the storage array 114. In various cases, the first indication and the second indication can be stored in the disc data format (DDF) region of the storage drives 116a-116n. The DDF region can be stored at the start and/or end of the storage drives 116a-116n. In various cases, the DDF can be stored before and/or after one or more boundaries or partitions dividing the DDF from user or host data stored on the storage drives 116a-116n. In some cases, the first and second indication can be stored in the DDF as a vendor-specific extension. The DDF supports vendor-specific extensions which can be used by manufacturers, vendors, or users of the controller 102 to store information that is relevant only to a manufacturers', vendors', or users' specific implementation or product. The DDF can also be used to store configurations for the storage array 114 and/or storage drives 116a-116n.

In a non-limiting example, one such vendor specific extension stored in the DDF can have an identifier PD_R1_ARM_SAFE_MIGRATION_RECORD_ID of and a new record structure PD_R1_ARM_SAFE_MIGRATION_RECORD:

```
PD_R1_ARM_SAFE_MIGRATION_RECORD_ID   0x77777777
typedef struct {
    BOOL   SafeToMigrate;      /* Drive was safely migrated or not */
    BOOL   LastMirrorOffline; /* Indicates state of Mirror */
} PD_R1_ARM_SAFE_MIGRATION_RECORD;
```

When controller 102 encounters the ID PD_R1_ARM_SAFE_MIGRATION_RECORD_ID, it will refer to the data corresponding to the ID stored in DDF as the structure PD_R1_ARM_SAFE_MIGRATION_RECORD.

Further operation of the controller 102 and the one or more drives 116a-116n is described below with respect to FIGS. 2-8.

Figure 2:
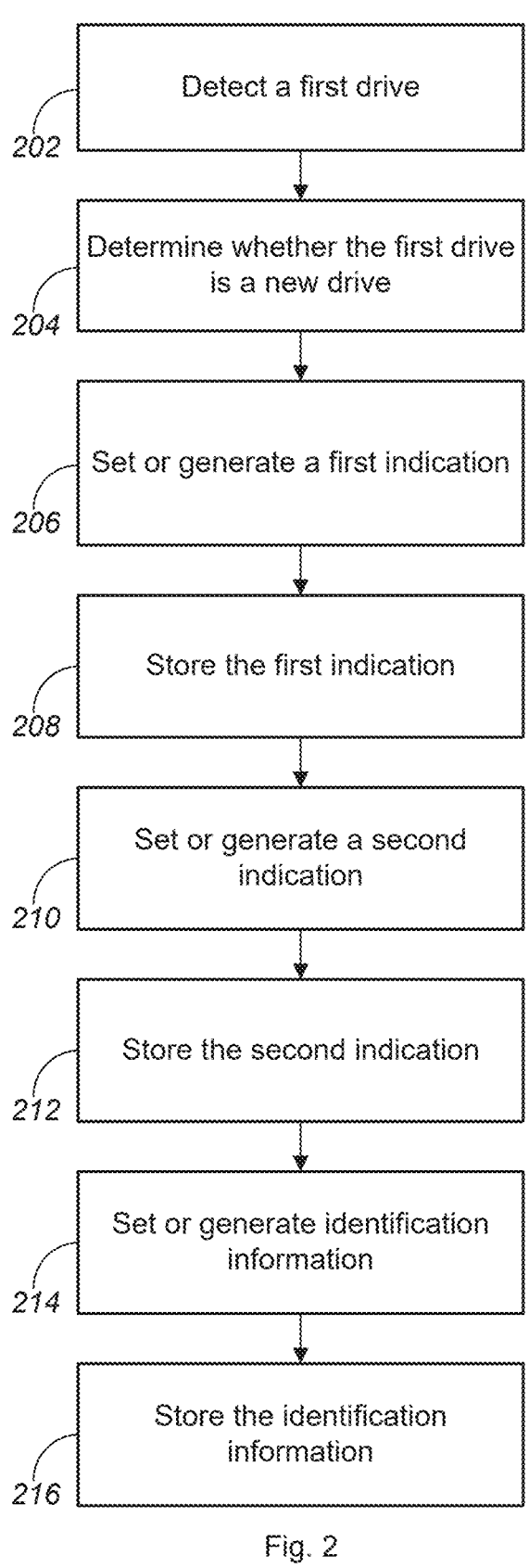
FIG. 2 is a flow diagram of a method to store one or more indications in a storage drive, in accordance with various embodiments.

FIG. 2 is a flow diagram 200 illustrating a process or method to store one or more indications in a storage of a first drive (e.g., storage drives 116a-116n) or a new drive upon initial setup of the first drive or new drive, in accordance with various embodiments. In some cases, the new drive could be the first drive with a first memory, a second drive with a second memory, a third drive with a third memory, a fourth drive with a fourth memory etc. that is coupled to the host system, controller, or storage array. In various cases, set up of the new drive could occur in a similar manner as set up of the first drive or second drive described below.

FIG. 2 merely provide an example, which should not unduly limit the scope of the claims. In some embodiments, the system 100 shown in FIG. 1 is capable of performing the set up and storage of the one or more indications in a storage of the first drive described in FIG. 2. However, the method is not limited to only being performed with system 100 of FIG. 1 and can be performed by other systems and/or storage architectures. In some cases, a host system, controller, processor, or circuit of system 100 is configured to execute the method 200. In some cases, different host systems, controllers, processors, or circuits are configured to execute one or more blocks or steps of the method 200. Alternatively, a single host system, controller, processor, or circuit is configured to execute the blocks or steps of the method 200.

Method 200 can begin at block 202 by detecting a first drive or a new drive (e.g., drive 116a). A host system (e.g., host system 112), controller (e.g., controller 102), storage array (e.g., storage array 114) or the like can detect that the first drive has been coupled to the host system, controller, and/or a storage array. When the host system, controller, or storage array detects that the first drive has been added or coupled to the host system, controller, and/or a storage array, the method 200 can proceed to block 204 and determine (e.g., with the controller) whether the first drive is a new drive (e.g., a drive that has not been coupled to the host system, controller, or storage array before, a drive that is not recognized by the host system, controller, or storage array, a drive that does not contain data that needs to be imported, and/or the like) that needs to be setup.

Based on a determination that the first drive is a new drive that needs to be setup, the method 200 can proceed to block 206 and set or generate a first indication indicating the first drive is not safe to migrate. In various cases, the first indication could be a third indication on a second drive, a fifth indication on a third drive, and/or the like. The third indication, fifth indication, and/or the like can function in a similar manner as the first indication described below. The terms "first," "third," "fifth," etc. are merely intended to distinguish between different indications stored on different drives.

The first indication can then be stored in a first memory of the first drive at block 208. The method can be configured to automatically set one or more first bits of the first drive to the first indication (e.g., "not safe to migrate") upon detection and set up of the first drive. In various cases, setting or generating the first indication and storing the first indication (across all methods described herein) can occur at the same time or about the same time and/or could be performed as a single step.

Additionally, in some embodiments, based on a determination that the first drive is a new drive that needs to be setup, the method 200 can proceed to block 210 and set or generate a second indication indicating the mirror drive of the first drive is not offline. In various cases, the second indication could be a fourth indication on a second drive, a sixth indication on a third drive, and/or the like. The second indication, sixth indication, and/or the like can function in a similar manner as the second indication described below. The terms "second," "fourth," "sixth," etc. are merely intended to distinguish between different indications stored on different drives.

The second indication can then be stored in a first memory of the first drive at block 212. In various cases, the second indication can be set and stored in response to a determination that the first indication has been set and stored. The method can be configured to automatically set one or more second bits of the first drive to the second indication (e.g., "mirror drive not offline") upon detection and set up of the first drive. In various cases, setting or generating the second indication and storing the second indication (across all methods described herein) can occur at the same time or about the same time and/or could be performed as a single step.

By automatically setting one or more first bits of the first drive to the first indication and one or more second bits to the second indication upon detection and set up of the first drive, the first drive can indicate that it is not safe to migrate and/or the mirror drive is not offline. This can be the default state (e.g., "not safe to migrate" and "mirror drive not offline") that is automatically set up and installed on one or more new drives upon initial setup of the first drive. Thus, if the first drive fails or is removed from the host system, controller, or storage array without going through a migration process, a new or different controller can determine that the first drive did not go through any process to prepare the first drive for migration and that the first drive was potentially not the last drive offline (e.g., the last drive offline with the latest and correct data).

In some cases, based on a determination that the first drive is a new drive that needs to be setup, the method 200 can additionally proceed to block 214 and set or generate (e.g., with the controller) identification information indicating a second drive that is a mirror drive of the first drive. The identification information can then be stored in a first memory of the first drive at block 216. The method can be configured to automatically set one or more bits of the first drive to contain the information associated with the second drive that is a mirror of the first drive upon detection and set up of the first drive. The identification information can include, without limitation, at least one of an identification number associated with the second drive, an internet protocol (IP) address associated with the second drive, a media access control (MAC) address associated with the second drive, or a globally unique identifier (GUID) associated with the second drive. In various cases, setting or generating the identification information and storing the identification information (across all methods described herein) can occur at the same time or about the same time and/or could be performed as a single step.

In various cases, one or more of the first indication, the second indication, and/or the identification information indicating the second drive that is a mirror drive of the first drive can be stored at specific locations in a memory of the first drive. In a non-limiting example, the one or more specific locations can be user specific (e.g., specified or determined by a vendor of the first drive, controller, or host system; specified or determined by a customer of the first drive, controller, or host system; specified or determined by a user of the first drive, controller, or host system; and/or the like). In various cases, one or more of the first indication, the second indication, and/or the identification information can be stored in the disc data format (DDF) of the first drive. One or more of the first indication, the second indication, and/or the identification information can also be stored at the beginning of the first drive or the end of the first drive.

The process described above with respect to FIG. 2 can be performed upon detection and setup of any new drive to a storage array. Thus, all drives within the storage array can have the first indication stored as "not safe to migrate" and the second indication stored as "mirror drive not offline" until a migration process to migrate one or more drives within the storage array occurs or a mirror drive of the drive goes offline. In various cases, both the first indication and the second indication can be stored together (e.g., at the same time or about the same time) on a new drive in an atomic operation.

Figure 3:
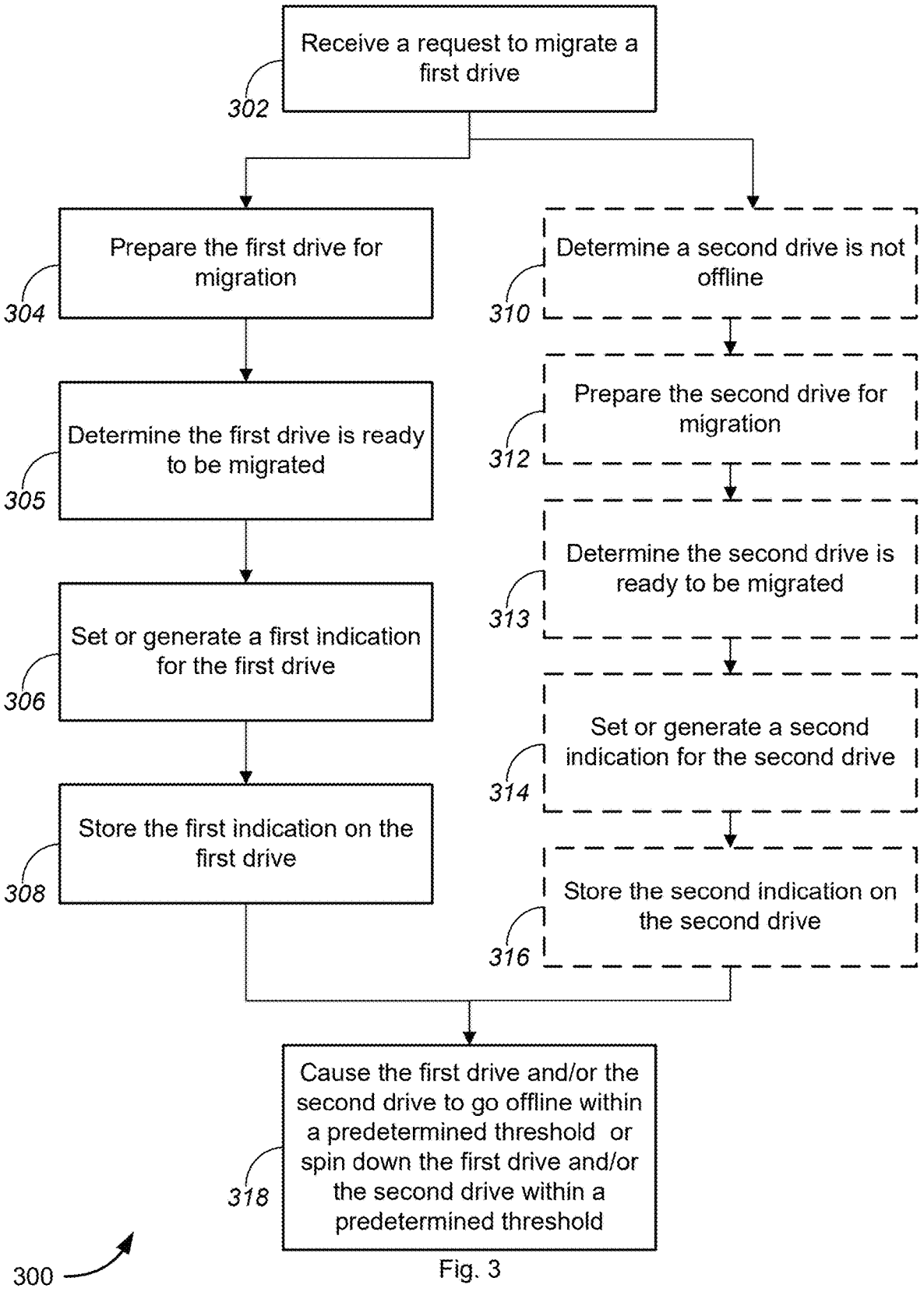
FIG. 3 is a flow diagram of a method to prepare a storage drive for migration, in accordance with various embodiments.

Turning to FIG. 3, FIG. 3 is a flow diagram 300 illustrating a process or method to prepare a first drive (e.g., storage drives 116a-116n) for migration to a different controller, different storage array, different host, or the like or prepare the first drive to be moved to a different controller, different storage array, different host, or the like, in accordance with various embodiments. These diagrams merely provide an example, which should not unduly limit the scope of the claims. In some embodiments, the system 100 shown in FIG. 1 is capable of preparing the first drive for the migration described in FIG. 3. However, the method is not limited to only being performed with system 100 of FIG. 1 and can be performed by other systems and/or storage architectures. In some cases, a host system, controller, processor, or circuit of system 100 is configured to execute the method 300. In some cases, different host systems, controllers, processors, or circuits are configured to execute one or more blocks or steps of the method 300. Alternatively, a single host system, controller, processor, or circuit is configured to execute the blocks or steps of the method 300.

Method 300 might begin at block 302 by receiving a request to migrate or move a first drive (e g., first storage drive 116*a*) to at least one of a different controller, a different storage array, a different host, or the like. The request can be received from a user (e.g., by user input) of a controller (e.g., controller 102), a user of the host system (e.g., host system 112), a user of a storage array (e.g., storage array 114), or the like. In various cases, the request to migrate the first drive can be received by a controller of the storage array, the host system, or the like. In some instances, the request to migrate the first drive is a logical drive or controller level operation and firmware of the logical drive or controller completes the migration request for the first drive. In some cases, the request to migrate the first drive is received as a request to migrate the logical drive or logical device (e.g., group of physical disk drives that appears to the operating system as a single drive that can be used to store data) comprising the first drive.

In some embodiments, the method 300 can then proceed to block 304 and prepare the first drive for migration or to be moved. In some cases, when the controller receives a migration request (e.g., to migrate the first drive, all drives, or the logical drive), all drives coupled to the controller can be prepared for migration or a logical drive or logical device comprising the first drive can be prepared for migration. In other cases, one or more first drives and one or more corresponding mirrors of the first drive can be prepared for migration. In order to prepare the first drive for migration, the method can, in some cases, be configured to stop all input and outputs into the first drive and hide the first drive from the host system, hide the logical drive from the host system, and/or hid all drives coupled to the controller from the host system, and/or the like. Other or different steps can also be used to prepare the first drive for migration and migration is not intended to only be limited to the steps described above. Once the first drive is finished being prepared for migration, the method can further determine that the first drive is ready to be migrated at block 305.

Based on a determination that the first drive is ready to be migrated, the method can continue to block 306 and set or generate a first indication indicating the first drive is safe (e.g., ready, prepared, capable, able, etc.) to migrate (e.g., move, transfer, or the like). The first indication can then be stored in a first memory of the first drive at block 308.

Additionally, in order to prepare the first drive for migration or to be moved, the method 300, at optional block 310, can further be configured to determine whether a second drive that is a mirror drive of the first drive is not offline. Next, method 300 at optional block 312 can prepare the second drive that is a mirror drive of the first drive for migration. In order to prepare the second drive for migration, the controller can be configured to stop all input and outputs into the second drive and hide the second drive from the host system, and/or the like. Once the second drive is finished being prepared for migration, the method 300 can further determine that the second drive is ready to be migrated at block 313. Based on a determination that the first drive is ready to be migrated, the method 300 can continue to optional block 314 and set or generate a second indication indicating the second drive is safe to migrate. The second indication can then be stored in a second memory of the second drive at optional block 316.

The processes to prepare the first drive and the second drive that is a mirror drive of the first drive for migration can occur in parallel (e.g., at the same time or about a same time)

or at different times. However, by preparing the first drive and the second drive in parallel for migration, all input and outputs into the first drive and the second drive can be stopped at the same time or about a same time. Additionally, the first drive and the second drive can be hidden from the host system at about the same time (e.g., at the same time or within a predetermined threshold (e.g., 0.1 seconds, 1 second, 5 seconds or the like), less than the predetermined threshold, or the like). The first drive and second drive can be hidden from the host system before the migration process begins Hiding the first drive and the second drive from the host system ensures that both the first drive and the second drive have the same or about the same data and/or the latest and correct data. Hiding the first drive and the second drive from the host system further ensures that inputs and outputs do not continue to occur on either the first drive and/or the second drive after the first drive and/or the second drive are prepared for migration.

In some cases, when the controller receives a migration request, all drives coupled to the controller can be prepared for migration or a logical drive comprising the first drive can be prepared for migration. In this case, all the drives coupled to the controller or the logical drive comprising the first drive can be prepared for migration in parallel or at different times. However, by preparing all the drives in parallel or the logical drive in parallel for migration, all input and outputs into drives can be stopped at the same time or about a same time. Additionally, all the drives coupled to the controller or the logical drive comprising the first drive can be hidden from the host system at about the same time (e.g., at the same time, within a predetermined threshold (e.g., 0.1 seconds, 1 second, 5 seconds or the like), less than the predetermined threshold, or the like). All drives coupled to the controller and/or the logical drive comprising the first drive can be hidden from the host device before the migration process begins. Hiding all the drives or the logical drive comprising the first drive from the host ensures that all the drives have the latest and correct data before the drives are migrated. Hiding the drives coupled to the controller or the logical drive comprising the first drive from the host further ensures that inputs and outputs do not continue to occur on drives after the drives are prepared for migration.

In some embodiments, once the first drive is prepared for migration and the second drive is optionally prepared for migration, the method 300 can continue at block 318 and spin down the first drive and/or the second drive. Spinning down the first drive and the second drive can occur in parallel. By spinning down the first drive and the second drive in parallel, each drive can be taken offline at the same time or about the same time. This further ensures that both the first drive and the second drive have the same or about the same data and/or the latest and correct data.

In some cases, all the drives coupled to the controller can be spun down. Spinning down the drives can occur in parallel. By spinning down the drives in parallel, each drive can be taken offline at the same time or about the same time. This further ensures that each drive has the latest and correct data.

Additionally, when the first drive and the second drive are taken offline at the same time or about the same time, a third indication stored in the second memory of the second drive indicating a mirror drive (e.g., the first drive) of the second drive was not offline and a fourth indication stored in the second memory of the second drive indicating a mirror (e.g., the first drive) of the second drive was not offline can remain unchanged. The third and fourth indications can each be automatically set to "mirror drive not offline" upon initial setup of the first drive and/or the second drive using the process described in FIG. 2.

In various embodiments, by indicating that a mirror drive of the first drive and/or the second drive are not offline, a new or different controller can determine that the first drive and/or the second drive were both prepared for migration and were spun down at the same time or about the same time. By determining that the first drive and/or the second drive were both prepared for migration and were spun down at the same time or about the same time, the new or different controller can determine that both the first drive and/or the second drive have the same or about the same data and/or the latest and correct data. This process is further described below with respect to FIGS. 7 and 8.

Turning to FIG. 4, FIG. 4 is a flow diagram 400 illustrating a process or method to prepare a drive (e.g., storage drives 116a-116n) for migration based on a detection of an offline state in a mirror drive, in accordance with various embodiments. These diagrams merely provide an example, which should not unduly limit the scope of the claims. In some embodiments, the system 100 shown in FIG. 1 is capable of preparing the storage drive for migration described in FIG. 4. However, the method is not limited to only being performed with system 100 of FIG. 1 and can be performed by other systems and/or storage architectures. In some cases, a host system, controller, processor, or circuit of system 100 is configured to execute the method 400. In some cases, different host systems, controllers, processors, or circuits are configured to execute one or more blocks or steps of the method 400. Alternatively, a single host system, controller, processor, or circuit is configured to execute the blocks or steps of the method 400.

Method 400 might begin at block 402 by detecting that a first drive (e.g., storage drive 116a) is offline. The first drive might go offline due to a fault, due to removal of the drive, due to loss of power, and/or the like. Method 400 can then proceed to optional block 404 and determine whether a second drive (e.g., storage drives 116b, 116c, or the like) that is a mirror drive of the first drive is not offline.

Based on a determination that the second drive is not offline, method 400 might then proceed to optional block 406 and generate a request to prepare the second drive that is a mirror drive of the first drive for migration. The request can be generated automatically by a controller (e.g., controller 102), a host system (e.g., host system 112), a storage array (e.g., storage array 114), or the like upon detection that the first drive is offline.

In some embodiments, the method 400 can continue to block 408 and prepare the second drive that is a mirror drive of the first drive for migration. In some cases, all drives coupled to the controller can be prepared for migration or a logical drive comprising the second drive can be prepared for migration. In some cases, upon detection that the first drive is offline, the method 400 might automatically proceed to preparing the second drive or logical drive for migration without proceeding through blocks 404 and/or 406. In order to prepare the second drive or logical drive for migration, the method can be configured to stop all input and outputs into the second drive or logical drive and hide the second drive or logical drive from the host system, and/or the like. Once the second drive is finished being prepared for migration, the method 400 can further determine that the second drive is ready to be migrated at block 409. Based on a determination that the second drive is ready to be migrated, the method can continue to block 410 and set or generate (e.g., with the controller) a first indication indicating the second drive is safe to migrate. The first indication can then be stored in the memory of the second drive at block 412.

Once the second drive is prepared for migration, the method 400 can continue at block 414 and set or generate a second indication indicating the mirror drive (e.g., first drive) of the second drive is offline. In other words, because the first drive went offline, the second drive was the last drive offline. The second indication can then be stored on the second drive at block 416 of method 400.

In some cases, the second indication might only be set or generated and stored on the second drive when the first indication (e.g., the first indication indicating that the drive is safe to migrate) has been set or generated and stored. Both the first indication and the second indication are updated together (e.g., at the same time or about the same time) in an atomic operation. Updating the first indication and the second indication together can be ensured by an integral write. Generating and storing the second indication when the first indication is set and stored indicates to a new or different host system (e.g., host system 112), controller (e.g., controller 102), or storage array (e.g., storage array 114) that the second drive is safe to migrate before the second drive was taken offline. Further, generating and storing the second indication when the first indication is set and stored indicates to a new or different host system, controller, or storage array that the second drive contains the latest and correct data. Thus, if both the first drive and the second drive are connected to a new or different host system, controller, or storage array, the new or different host system, controller, or storage array can determine that the second drive has the latest and correct data while the first drive was taken offline before a migration process was performed.

Once the second indication is stored in the second drive, the method 400 can proceed to block 418 and spin down the second drive. Spinning down the second drive can include turning the second drive off, powering down the second drive, placing the second drive in a sleep mode, and/or the like. In some cases, all drives coupled to the storage array and/or controller can be spun down at the same time or about the same time once the drives have been prepared for migration.

Turning to FIG. 5, FIG. 5 is a flow diagram 500 illustrating a process or method to migrate or couple a first drive (e.g., storage drives 116a-116n) or a new drive to a new or different controller and/or storage array when only one storage drive is detected, in accordance with various embodiments. In various cases, migration of the new drive could occur in a similar manner as migration of the first drive described below. These diagrams merely provide an example, which should not unduly limit the scope of the claims. In some embodiments, the system 100 shown in FIG. 1 is capable of preparing the storage drive for migration described in FIG. 5. However, the method is not limited to only being performed with system 100 of FIG. 1 and can be performed by other systems and/or storage architectures. In some cases, a host system, controller, processor, or circuit of system 100 is configured to execute the method 500. In some cases, different host systems, controllers, processors, or circuits are configured to execute one or more blocks or steps of the method 500. Alternatively, a single host system, controller, processor, or circuit is configured to execute the blocks or steps of the method 400.

Method 500 can begin at block 502 by detecting a first drive (e.g., drive 116a) or a new drive. A host system (e.g., host system 112), controller (e.g., controller 102), storage array (e.g., storage array 114), or the like can detect that the first drive has been coupled to the host system, controller, and/or a storage array. When the method detects that the first drive has been added or coupled to the host system, controller, and/or a storage array, the method 500 can proceed to block 504 and determine (e.g., with the controller) whether the first drive is a new drive that needs to be imported (e.g., migrated, installed or the like). In some cases, although the first drive is a new drive to the host system, controller, or storage array, the first drive can contain data that needs to be imported from another or different host system, controller, or storage array, or the like.

Based on a determination that the first drive is a new drive that needs to be imported, the method 500 can proceed to block 506 and detect or determine a first indication stored in a first memory of the first drive indicating whether the first drive is safe to migrate or not safe to migrate. The method can be configured to automatically determine the first indication (e.g., "safe to migrate" or "not safe to migrate") upon detection or coupling of the first drive to the host system, controller, and/or a storage array.

Based on a determination of the first indication, the method 500 can proceed to block 508 and detect a second indication stored in a memory of the first drive indicating whether a mirror drive of the first drive was offline or whether a mirror drive of the first drive was not offline at the time when the first drive was ready to migrate and spun down. In some cases, the mirror drive can be a second drive or a fourth drive. In various cases, the second drive or fourth drive can function in a similar manner as the mirror drive described below. The method can be configured to automatically determine the second indication (e.g., "mirror drive offline" or "mirror drive not offline") upon detection or coupling of the first drive to the host system, controller, and/or a storage array. In various cases, both the first indication and the second indication can be determined together (e.g., at the same time or about the same time) in an atomic operation.

Based on the determination of the first indication and/or the second indication, the method 500 can proceed to block 510 and determine whether to import the first drive into the host system, controller, storage array, or the like or rebuild the first drive.

Based on a determination to import the first drive or rebuild the first drive and/or after the first drive is imported or rebuilt, the first indication and the second indication can be reset on the first drive back to a default state (e.g., "not safe to migrate" and "mirror drive not offline").

FIG. 6 comprises Table 600 showing one or more decisions that a controller, host system, storage array or the like can make based upon the determination of the first indication and the second indication. At line 602 of Table 600, the first indication stored in the first drive is set to true and the second indication stored in the first drive is also set to true. If the first indication is true (e.g., the first drive is safe to migrate) and the second indication is true (e.g., the mirror drive of the first drive was offline), then the controller, host system, storage array, etc. can import the first drive because the first drive was prepared and ready for migration (e.g., the first drive had the latest and correct data before it was spun down). However, the storage array or logical drive was degraded at the time of safe migration because the second drive that is a mirror drive of the first drive was offline at the time that the first drive went through the migration process. Additionally, the storage array or logical drive is in a degraded state at the time it is imported into the host system, controller, and/or a storage array or the like because the host system, controller, and/or a storage array is missing the second drive that is a mirror drive of the first drive.

At line 604 of Table 600, the first indication stored in the first drive is set to true and the second indication stored in the first drive is set to false. If the first indication is true (e.g., the first drive is safe to migrate) and the second indication is false (e.g., a mirror drive of the first drive was not offline at the time the first drive was prepared and ready to migrate and spun down), then the controller, host system, storage array, etc. can import the first drive because the first drive was prepared and ready for migration. Additionally, the storage array or logical drive was not degraded at the time of safe migration because the second drive that is a mirror drive of the first drive was spun down at the same time or about the same time as the first drive. However, the storage array or logical drive is in a degraded state at the time the first drive is imported into the host system, controller, or storage array or the like because the first drive is being imported alone and is missing the second drive. In some cases, the host system, controller, storage array, or the like can wait (e.g., a predetermined amount of time, a limited threshold, or the like) until the second drive is detected (e.g., until the second drive is coupled to the host system, controller, storage array, or the like). In other cases, the host system, controller, storage array, or the like can detect by a pre-processing cycle that both the first drive and the second drive is coupled to the host system, controller, storage array, or the like. Upon detection of the second drive, the host system, controller, storage array, or the like can import the first drive and the second drive at the same time or about the same time.

At line 606 of Table 600, the first indication stored in the first drive is set to false and the second indication stored in the first drive is also set to false. If the first indication is false (e.g., the first drive is not safe to migrate) and the second indication is false (e.g., a mirror drive of the first drive was not offline), then the controller, host system, storage array, etc. will not automatically import the first drive because the first drive was not prepared and ready for migration (e.g., the first drive potentially did not have the latest and correct data before it was spun down). However, a user of the first drive, new host system, controller, or storage array or the like could be given the option (e.g., via a notification or the like) to force import of the first drive anyway. If the user of the first drive, new host system, controller, or storage array selects to import the first drive, then data from the first drive can then be imported into the new host system, controller, or storage array or the like.

In some embodiments, at line 608 of Table 600, the first indication stored in the first drive is set to false and the second indication stored in the first drive is set to true. In some cases, the situation where the first indication is false (e.g., the first drive is not safe to migrate) and the second indication is true (e.g., the mirror drive of the first was offline) cannot happen. This situation cannot happen in some cases because the second indication can only be set after the first indication is set to true (e.g., safe to migrate). Thus, if the first indication is not set to true on the first drive, the second indication cannot be set to true because the default state of the second indication is false.

Turning to FIG. 7, FIG. 7 is a flow diagram 700 illustrating a process or method to migrate or couple a first drive (e.g., storage drives 116a-116n) or new drive to a new or different host system, controller, and/or storage array when the first drive is detected and a second drive that is a mirror drive of the first drive is detected, in accordance with various embodiments. In various cases, migration of the new drive could occur in a similar manner as migration of the first drive described below. These diagrams merely provide an example, which should not unduly limit the scope of the claims. In some embodiments, the system 100 shown in FIG. 1 is capable of preparing the storage drive for migration described in FIG. 7. However, the method is not limited to only being performed with system 100 of FIG. 1 and can be performed by other systems and/or storage architectures. In some cases, a host system, controller, processor, or circuit of system 100 is configured to execute the method 700. In some cases, different host systems, controllers, processors, or circuits are configured to execute one or more blocks or steps of the method 700. Alternatively, a single host system, controller, processor, or circuit is configured to execute the blocks or steps of the method 700.

Method 700 might begin at block 702 by detecting a first drive (e.g., drive 116a). A host system (e.g., host system 112), controller (e.g., controller 102), storage array (e.g., storage array 114) or the like can detect that first drive has been coupled to the host system, controller, and/or a storage array. When the method detects that the first drive has been added or coupled to the host system, controller, and/or a storage array, the method 700 can proceed to block 704 and determine whether the first drive is a new drive that needs to be imported. In some cases, although the first drive is a new drive to the host system, controller, or storage array, the first drive can contain data that needs to be imported from another or different host system, controller, or storage array, or the like.

Based on a determination that the first drive is a new drive that needs to be imported, the method 700 can proceed to block 706 and detect a first indication stored in a first memory of the first drive indicating whether the first drive is safe to migrate or not safe to migrate. The method can be configured to automatically determine the first indication (e.g., "safe to migrate" or "not safe to migrate") upon detection or coupling of the first drive to the host system, controller, and/or storage array.

Based on a determination of the first indication, the method 700 can proceed to block 708 and detect a second indication stored in a memory of the first drive indicating whether a mirror drive (e.g., second drive) of the first drive was offline or whether a mirror drive (e.g., second drive) of the first drive was not offline. In various cases, the mirror drive of a third drive could be a fourth drive. In some cases, the fourth drive can function in a similar manner as the second drive described below. The method can be configured to automatically determine the second indication (e.g., "mirror drive offline" or "mirror drive not offline") upon detection or coupling of the first drive to the host system, controller, and/or storage array. In various cases, both the first indication and the second indication can be determined together in an atomic operation.

Next, the method 700, at block 710 might detect a second drive (e.g., drives 116b, 116c, etc.) that is a mirror drive of the first drive. The detection of the second drive might occur before the detection of the first drive, at a same time or about the same time as the detection of the first drive, or after the detection of the first drive. In some cases, the host system might wait until detection of the second drive before deciding whether to import data from the first drive. The host system, controller, storage array, or the like might determine that the second drive is a mirror of the first drive based on identification information (e.g., identifying the first drive and/or the one or more second drives) stored in a first memory of the first drive and/or stored in a second memory of the second drive.

When the method detects that the second drive has been added or coupled to the host system, controller, and/or storage array, the method 700 can proceed to block 712 and determine whether the second drive is a new drive that needs to be imported. In some cases, although the second drive is a new drive to the host system, controller, or storage array, the second drive can contain data that needs to be imported from another or different host system, controller, or storage array, or the like.

Based on a determination that the second drive is a new drive that needs to be imported, the method 700 can proceed to block 714 and detect a third indication stored in a second memory of the second drive indicating whether the second drive is safe to migrate or is not safe to migrate. The method can be configured to automatically determine the third indication (e.g., "safe to migrate" or "not safe to migrate") upon detection or coupling of the second drive to the host system, controller, and/or storage array.

Based on a determination of the third indication, the method 700 can proceed to block 716 and detect a fourth indication stored in a second memory of the second drive indicating whether the mirror drive (e.g., first drive) of the second drive was offline or a mirror drive (e.g., first drive) of the second drive was not offline. The method can be configured to automatically determine the fourth indication (e.g., "mirror drive offline" or "mirror drive not offline") upon detection or coupling of the second drive to the host system, controller, and/or storage array. In various cases, both the third indication and the fourth indication can be determined together in an atomic operation.

Based on the first indication, second indication, third indication, and/or fourth indication, method 700 can proceed to block 718 and determine whether to import data from the first drive and/or the second drive into the host system, controller, storage array, or the like or rebuild the first drive and/or second drive.

Based on a determination to import the first drive and/or second drive or rebuild the first drive and/or second drive and/or after the first drive and/or second drive is imported or rebuilt, the first indication and the second indication can be reset on the first drive back to a default state (e.g., "not safe to migrate" and "mirror drive not offline") and the third indication and the fourth indication can be reset on the second drive back to a default state (e.g., "not safe to migrate" and "mirror drive not offline").

FIG. 8 comprises Table 800 showing one or more decisions that a controller, host system, storage array or the like can make based upon the determination of the first indication, the second indication, the third indication, and/or the fourth indication. At line 802 of Table 800, the first indication stored in the first drive is set to false and the second indication stored in the first drive is also set to false. For the second drive, the third indication stored in the second drive is set to false and the fourth indication stored in the second drive is also set to false. If the first indication is false (e.g., the first drive is not safe to migrate), the second indication is false (e.g., mirror drive (e.g., second drive) was not offline), the third indication is false (e.g., the second drive is not safe to migrate), the fourth indication is false (e.g., mirror drive (e.g., first drive) was not offline), then the controller, host system, storage array, etc. can import data from the first drive and the second drive because the first drive and the second drive have the same data or about the same data. This situation can occur due to events such as a power failure where both the first drive and the second drive go offline at the same time or about the same time. In this situation, both the first drive and the second drive would have the same data and/or the latest and correct data because both drives went offline at the same time or about the same time. Thus, the state of both drives would be optimal because each drive has the same or about the same data and both drives can be imported into the host system, controller, storage array or the like because both drives have the same data.

At line 804 of Table 800, the first indication stored in the first drive is set to true and the second indication stored in the first drive is also set to true. For the second drive, the third indication stored in the second drive is set to false and the fourth indication stored in the second drive is also set to false. If the first indication is true (e.g., the first drive is safe to migrate), the second indication is true (e.g., the mirror drive (e g., second drive) was offline), the third indication is false (e.g., the second drive is not safe to migrate), and the fourth indication is false (e.g., the mirror drive (e.g., first drive) was not offline) then the controller, host system, storage array, etc. can import data from the first drive because the first drive was prepared and ready for migration and was the last drive offline. However, the storage array or logical drive was degraded at the time of safe migration because the second drive that is a mirror of the first drive was offline at the time that the first drive went through the migration process. Once the first drive is imported, the second drive can then be rebuilt based on the first drive.

Line 806 of Table 800 is about the same as line 804 of Table 800 described above. However, in line 806, the first drive is not safe to migrate and the mirror drive (e.g., second drive) was not offline and the second drive is safe to migrate and the mirror drive (e.g., first drive) was offline. In this situation, the second drive would be imported while the first drive would be rebuilt.

In some embodiments, at line 808 of Table 800, the first indication stored in the first drive is set to true and the second indication stored in the first drive is set to false. The third indication stored in the second drive is set to true and the second indication is set to false. If the first indication is true (e.g., the first drive is safe to migrate), the second indication is false (e.g., the mirror drive (e.g., second drive) was not offline), the third indication is true (e.g., the second drive is safe to migrate), and the fourth indication is false (e.g., the mirror drive (e.g., first drive) was not offline), then the controller, host system, storage array, etc. can import the first drive and the second drive because both the first drive and the second drive were prepared and ready for migration. Additionally, the storage array or logical drive was not degraded at the time of safe migration because the first drive and the second drive were prepared for migration and spun down at the same time or about the same time. In this situation, data from both the first drive and the second drive can be imported because each drive has the same data or about the same data and/or each drive has the latest and correct data.

In various cases, at line 810 of Table 800, the first indication stored in the first drive is set to false and the second indication stored in the first drive is set to false. The third indication stored in the second drive is set to true and the second indication is set to false. If the first indication is false (e.g., the first drive is not safe to migrate), the second indication is false (e.g., the mirror drive (e.g., second drive) was not offline), the third indication is true (e.g., the second drive is safe to migrate), and the fourth indication is false (e.g., the mirror drive (e.g., first drive) was not offline), then the controller, host system, storage array, etc. can import data from the second drive because the second drive was prepared and ready for migration. This situation can occur when an event such as a power failure or the like takes the first drive offline before the first drive can finish preparing for migration. In this situation, both the first drive and the second drive went offline at the same time or about the same time, however, only the second drive completed the migration process. Thus, in this situation, only data from the second drive can be imported into the new host system, controller, storage array, or the like while the first drive needs to be rebuilt based on the data imported from the second drive.

Line 812 of Table 800 is about the same as line 810 of Table 800 described above. However, in line 812, the first drive is safe to migrate and the mirror drive (e.g., second drive) was not offline and the second drive is not safe to migrate and the mirror drive (e.g., first drive) was not offline. In this situation, the first drive would be imported while the second drive would be rebuilt.

At line 814 of Table 800, the first indication stored in the first drive is set to true and the second indication stored in the first drive is also set to true. For the second drive, the third indication stored in the second drive is set to true and the fourth indication stored in the second drive is also set to true. If the first indication is true (e.g., the first drive is safe to migrate), the second indication is true (e.g., the mirror drive (e.g., second drive) was offline), the third indication is true (e.g., the second drive is safe to migrate), and the fourth indication is true (e.g., the mirror drive (e.g., second drive) was offline), then this situation cannot occur. This situation cannot occur because the first drive and the second both cannot indicate that the mirror was offline.

The techniques and processes described above with respect to various embodiments may be used to allow safe migration of one or more drives from one host system, controller, or storage array to another host system, controller, or storage array, as described herein. As discussed above, by storing one or more indication on the storage drives themselves, new host systems, controllers, or storage arrays or the like can easily determine whether the one or more storage drives were prepared for migration or whether the one or more storage drives failed before a migration process could occur. By determining whether the storage drives were prepared for migration, the new host systems, controllers, or storage arrays or the like can determine whether the one or more storage drives have the latest and correct data.

While some features and aspects have been described with respect to the embodiments, one skilled in the art will recognize that numerous modifications are possible. For example, the methods and processes described herein may be implemented using hardware components, custom integrated circuits (ICs), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Referring generally again to FIGS. 2-5 and 7, for the purposes of the present disclosure, the term "controller," "processor" or "processing element" may be broadly defined to encompass any device having one or more processing or logic elements (e.g., one or more micro-processor devices, one or more application specific integrated circuit (ASIC) devices, one or more field programmable gate arrays (FP-GAs), or one or more digital signal processors (DSPs)). In this sense, the one or more processors may include any device configured to execute algorithms and/or instructions (e.g., program instructions stored in memory). Furthermore, the memory may include any storage medium known in the art suitable for storing program instructions executable by the associated processor. For example, the memory medium may include a non-transitory memory medium. By way of another example, the memory medium may include, but is not limited to, a read-only memory (ROM), a random-access memory (RAM), a magnetic or optical memory device (e.g., disk), a solid-state drive and the like. It is further noted that memory medium may be housed in a common controller housing with the processor. In embodiments, the memory medium may be located remotely with respect to the physical location of the processor.

In the present disclosure, the methods, operations, and/or functionality disclosed may be implemented as a step switching hardware system and/or as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

What is claimed is:

1. A controller for a redundant array of independent disks (RAID) comprising:

a processor configured to:

set a first indication indicating a first drive of a storage array is safe to migrate or not safe to migrate, wherein the first drive is a first mirror of a second drive of the storage array, and wherein the first drive and the second drive are separate and different devices from the controller;

store the first indication in a first memory on the first drive;

set a second indication indicating the second drive was not offline or offline; and store the second indication in the first memory on the first drive;

wherein the first indication and the second indication each comprises a single bit within an unsigned 32-bit field stored in a disc data format (DDF) region of the first drive, the bits being adjacent so that the first indication and the second indication are stored and accessed together atomically.

2. The controller of claim 1, wherein the controller can receive input indicating a location to store at least one of the first indication or the second indication in the first memory of the first drive.

3. The controller of claim 1, wherein the processor is further configured to:

determine the first drive satisfy a condition a drive that has not been coupled to the host system, controller, or storage array before, a drive that is not recognized by the host system, controller, or storage array, a drive that does not contain data that needs to be imported; and based on a determination that the first drive satisfies the condition, set the first indication to indicate that the first drive is not safe to migrate and set the second indication to indicate that the second drive was not offline.

4. The controller of claim 1, wherein the processor is further configured to:

receive a request to migrate the first drive;

in response to receiving the request to migrate the first drive, prepare the first drive to be migrated;

determine the first drive is ready to be migrated;

in response to a first determination that the first drive is ready to be migrated, set the first indication indicating the first drive is safe to migrate; and store the first indication indicating the first drive is safe to migrate in the first memory of the first drive.

5. The controller of claim 4, wherein the request to migrate the first drive is received in response to an input requesting migration of a logical drive comprising the first drive.

6. The controller of claim 5, wherein, in response to the input requesting migration of the first drive, the processor is further configured to:

determine the second drive is not offline;

based on a determination the second drive is not offline, prepare the second drive to be migrated;

determine the second drive is prepared to be migrated;

in response to a second determination that the second drive is prepared to be migrated, set a third indication indicating the second drive is safe to migrate; and store the third indication indicating the second drive is safe to migrate in a second memory of the second drive.

7. The controller of claim 6, wherein the processor is further configured to:

cause the first drive and the second drive to go offline within a predetermined threshold, and, wherein the second indication indicates the second drive was not offline and a fourth indication stored in a second memory of the second drive indicates the first drive was not offline.

8. The controller of claim 1, wherein the processor is further configured to:

detect the second drive is offline;

in response to detecting the second drive is offline, prepare the first drive to be migrated;

determine the first drive is ready to be migrated;

in response to a determination that the first drive is ready to be migrated, set the first indication indicating the first drive is safe to migrate; and store the first indication indicating the first drive is safe to migrate in the first memory of the first drive.

9. The controller of claim 8, wherein, in response to storing the first indication indicating the first drive is safe to migrate in the first memory of the first drive, the processor is further configured to:

set the second indication indicating the second drive was offline;

store the second indication indicating the second drive was offline in the first memory of the first drive; and cause the first drive to go offline.

10. The controller of claim 1, wherein the processor is further configured to:

detect a third drive coupled to the controller; and in response to detecting the third drive, determine whether a fifth indication stored in a third memory of the third drive indicates the third drive was safe to migrate or not safe to migrate and determine whether a sixth indication stored in the third memory of the third drive indicates a fourth drive was offline or not offline, wherein the fourth drive is a second mirror of the third drive.

11. The controller of claim 10, wherein the processor is further configured to:

determine the fifth indication indicates the third drive is safe to migrate;

determine the sixth indication indicates the fourth drive was offline; and in response to determining the fifth indication indicates the third drive is safe to migrate and the sixth indication indicates the fourth drive was offline, import data from the third drive.

12. A first drive for a redundant array of independent disks (RAID), the first drive comprising:

a memory configured to:

store a first indication indicating the first drive is safe to migrate, wherein the first drive is a mirror of a second drive; and store a second indication indicating the second drive was offline or not offline when the first drive was safe to migrate;

wherein the first indication and the second indication each comprises a single bit within an unsigned 32-bit field stored in a disc data format (DDF) region of the first drive, the bits being adjacent so that the first indication and the second indication are stored and accessed together atomically.

13. The first drive of claim 12, wherein the memory is further configured to:

store identification information associated with the second drive.

14. The first drive of claim 13, wherein the identification information comprises at least one of an identification number associated with the second drive, an internet protocol address associated with the second drive, a media access control address associated with the second drive, or a globally unique identifier associated with the second drive.

15. The first drive of claim 12, wherein the memory comprises at least one of optical or magnetic disk storage, flash memory, or programmable read-only memories.

16. The first drive of claim 12, wherein the first drive can receive input indicating a location to store at least one of the first indication or the second indication in the memory of the first drive.

17. A method for operating a controller of a redundant array of independent disks (RAID) comprising:

detecting, with the controller, a first drive of a storage array, wherein the first drive is a mirror of a second drive of the storage array, and wherein the first drive and the second drive are separate and different devices from the controller;

determining a first indication stored in a first memory of the first drive indicating the first drive is safe to migrate or not safe to migrate; and determining a second indication stored in the first memory of the first drive indicating the second drive was offline or not offline;

wherein the first indication and the second indication each comprises a single bit within an unsigned 32-bit field stored in a disc data format (DDF) region of the first drive, the bits being adjacent so that the first indication and the second indication are stored and accessed together atomically.

18. The method of claim 17, further comprising:

determining the first indication indicates the first drive is safe to migrate;

determining the second indication indicates the second drive was offline; and in response to determining the first indication indicates the first drive is safe to migrate and the second indication indicates the second drive was offline, importing data from the first drive.

19. The method of claim 17, further comprising:

determining the first indication indicates the first drive is safe to migrate;

determining the second indication indicates the second drive was not offline; and in response to determining the first indication indicates the first drive is safe to migrate and the second indication indicates the second drive was not offline, at least one of waiting to import data from the first drive until the second drive is detected or importing the first drive based on an input to import the first drive.

20. The method of claim 19, further comprising:

detecting the second drive coupled to the controller;

determining a third indication stored in a second memory of the second drive indicates the second drive is safe to migrate;

determining a fourth indication stored in the second memory of the second drive indicates the first drive was not offline; and in response to determining the first indication indicates the first drive is safe to migrate, the second indication indicates the second drive was not offline, the third indication indicates the second drive is safe to migrate, and the fourth indication indicates the first drive was not offline, importing the data from the first drive and the second drive.

* * * * *